USOO5616221A

United States Patent [19]
Aoki et al.

[11] Patent Number: 5,616,221
[45] Date of Patent: Apr. 1, 1997

[54] ELECTROLYTIC IONIZED WATER PRODUCING APPARATUS

[75] Inventors: Hidemitsu Aoki, Tokyo; Koji Yamanaka, Saitama; Takashi Imaoka, Saitama; Takashi Futatsuki, Saitama; Yukinari Yamashita, Saitama, all of Japan

[73] Assignees: NEC Corporation; Organo Corporation, both of Tokyo, Japan

[21] Appl. No.: 549,570

[22] Filed: Oct. 27, 1995

[30] Foreign Application Priority Data

Oct. 28, 1994 [JP] Japan .................................. 6-265812

[51] Int. Cl.$^6$ ............................................. C02F 1/461
[52] U.S. Cl. ..................... 204/252; 204/263; 204/628; 204/632; 205/743; 205/746; 205/748
[58] Field of Search ........................ 205/743, 746, 205/748; 204/632, 628, 252, 263, 275

[56] References Cited

U.S. PATENT DOCUMENTS

| | | | |
|---|---|---|---|
| 3,869,376 | 3/1975 | Tejeda | 204/632 |
| 4,465,573 | 8/1984 | O'Hare | 204/632 |
| 4,687,561 | 8/1987 | Kunz | 204/632 |
| 4,964,970 | 10/1990 | O'Hare | 204/632 |

OTHER PUBLICATIONS

JAPIO Abstract No. 04640289 and JP 6312189 A (Okazi Tatsuo), abstract only Nov. 1994.
WPI Abstract Accession No. 90–28765138 and JP 2203988 A (Shimizu), abstract only Aug. 1990.

*Primary Examiner*—Arun S. Phasge
*Attorney, Agent, or Firm*—Fish & Richardson P.C.

[57] ABSTRACT

An electrolytic ionized water (EIW) producing apparatus comprises an anode, a cathode, an electrolyzer which includes an anode chamber, a cathode chamber and an intermediate chamber, inlet lines for supplying an influent water to the three chambers, and outlet lines for discharging effluent water from the chambers. Further, an acidic electrolyte supplying unit is connected to the outlet line from the anode chamber, and an alkaline electrolyte supplying unit is connected to the outlet line from the cathode chamber. The electrolyte supplying units can selectively control at least the dosage level of elelctrolyte(s) to be supplied, the composition and concentration of the electrolyte(s) or pH of EIW after the addition of the electrolyte(s).

14 Claims, 3 Drawing Sheets

ELECTROLYTIC IONIZED WATER PRODUCING APPARATUS

BACKGROUND OF THE INVENTION

1. Field of the Invention

This invention relates to an apparatus for producing electrolytic ionized water (hereinafter referred to as EIW) which is applicable to sterlization, anti-oxidation treatment for metal surfaces, and washing and removing various contaminants sticking onto surfaces of solid objects and so on.

2. Description of the Related Art

In the following description, the term "anode" denotes an electrode to which a positive voltage is applied in an electrolyzer performing electrolysis by conducting a direct current to a water or aqueous solution. Likewise, the term "cathode" denotes an electrode to which a negative voltage is applied. During the electrolysis, an aqueous solution present around the anode is called "anode chamber EIW", while an aqueous solution around the cathode is called "cathode chamber EIW".

Positive charges are applied to the anode while negative charges are applied to the cathode. Specifically, the anode functions to take electrons away from the anode chamber water, while the cathode functions to provide the electrons to the cathode chamber water.

The water or aqueous solutions which are obtained through the electrolysis are generally called EIW. Further, the term "electrolysis" denotes simply to apply a DC voltage to a water or aqueous solution, but it is not necessary confined to such a process in which a direct current is conducted following the application of the DC voltage to effect electrolytic reactions thereby, decomposing the water or aqueous solution into oxygen and hydrogen. When an anode chamber and a cathode chamber are separated in an electrolyzer by a diaphragm made of a synthetic polymer (e.g. polyethylene, polypropylene, polyester, polystyrene, fluororesin and so forth) or an inorganic substance such as ceramics, the anode is housed in the anode chamber while the cathode is housed in the cathode chamber.

Generally speaking, the anode chamber water is oxidative, and has a high oxidation-reduction potential while the cathode chamber water is reductive, and has a low oxidation-reduction potential. In addition to the oxidation and reduction characteristics of the chamber EIW, when influent water to an electrolyzer contains electrolytes, the anode chamber effluent generally has an acidic hydrogen ion activity (pH) while the cathode chamber effluent has an alkali hydrogen ion activity (pH).

The anode chamber effluent has the oxidation characteristics because oxygen, ozone and other products oxidized from other matter are generated on a surface of the anode. With respect to the cathode chamber effluent, hydrogen and other products reduced from other matter are generated.

The anode chamber effluent has the acidic pH because anions are attracted to the positive charges of the anode, and cations are driven away from the anode, so a hydrogen ion anode chamber EIW has an acidic pH whereas the cathode chamber EIW has an alkaline pH. The reason why the anode chamber EIW is oxidative is that oxidative products are present on the surface of the anode, which products include oxygen and ozone generated on the anode surfaces and other oxidative substances formed by the oxidation on the surfaces of the anode. On the other hand, the reason why the cathode chamber EIW is reductive is that reductive products are present on the surfaces of the cathode, which products include hydrogen generated on the cathode surfaces and other reductive substances formed by the reduction on the surfaces of the cathode.

The anode chamber EIW produced by the electrolysis has strong sterilization characteristics because of its oxidative nature, and has been widely used as sterilizing water in hospitals, dental clinics, restaurants, food processing industries, and so on. The cathode chamber EIW is known to be effective in preventing metal surfaces from being oxidized by oxygen in the atmosphere in metal parts manufacturing processes, and so on. Further, the foregoing anode and cathode EIW are known to be effectively used to wash off various contaminants sticking to surfaces of solid objects.

Various contaminants such as metals, particles, oil and the like on the solid objects can be effectively cleaned using cleaning solutions whose oxidation-reduction potential and pH are adjusted to the conditions of the surfaces of the objects to be cleaned. For instance, an acidic and oxidizing cleaning agent is effective in ionizing, dissolving and removing metallic impurities from a solid object. Further, organic contaminants such as oil can be effectively oxidized, decomposed and removed using oxidizing cleaning solutions.

Most of particulate substances are usually charged opposite to the charge of a surface of a solid object and are electrostatically attracted thereto. An alkaline and reducing cleaning solution can often alleviate the electrostatic attraction of the particles to the solid object, suspend and float them therein, and remove them off from the surface of the solid object.

FIGS. 2 and 3 of the accompanying drawings show examples of EIW producing apparatuses of the prior art. Specifically, the apparatus of FIG. 2 includes an electrolyzer 101 having two electrolytic chambers, while the apparatus of FIG. 3 includes an electrolyzer 201 having three electrolytic chambers.

Referring to FIG. 2, the electrolyzer 101 has an anode chamber 106 and a cathode chamber 108 which are partitioned by a diaphragm 102. The anode chamber 106 houses an anode 104, while the cathode chamber 108 houses a cathode 105. Each of these chambers 106 and 108 receives influent water via an inlet line 109. Two water electrolyzed in these chambers 106 and 108 flow out therefrom via outlet lines 114 and 116, respectively. A DC voltage is applied to the anode 104 and the cathode 105 via power supply lines 118 and 119, respectively.

The electrolyzer 201 in FIG. 3 has an anode chamber 206, an intermediate chamber 207 and a cathode chamber 208. The intermediate chamber 207 is sandwiched between the anode chamber 206 and the cathode chamber 208, and is partitioned from these chambers by diaphragms 202 and 203. Influent water such as tap water, deionized water or the like is supplied to these chambers 206, 207 and 208 via an inlet line 209. From these chambers, three kinds of EIW flow out via outlet lines 214, 215 and 216. Reference numerals 218 and 219 denote power supply lines for applying a DC voltage to the anode 204 and the cathode 205, respectively.

The conventional apparatuses shown in FIGS. 2 and 3 have the following drawbacks when they are used to produce EIW which is used to prevent oxidation of metal surfaces, for the cleaning of solid objects carrying various contaminants thereon, and so on.

For instance, in the electrolyzer of FIG. 2, the anode chamber 106 and the cathode chamber 108 are simply separated by the diaphragm 102 made, for example, of a porous polymeric membrane. Thus, a part of oxidizing substances formed on the anode and a part of reducing substances formed on the cathode may inevitably migrate into the adjacent chambers 108 and 106 via the diaphragm 102, respectively. Thus, a part of the useful oxidizing substances or reducing substances may be made to disappear due to oxidation-reduction reaction of the oxidizing and reducing substances. This means reduced efficiency of the production of EIW. Further, it is difficult to selectively determine characteristics of EIW such as a wide range of oxidation-reduction potentials, pH's and so on.

In contrast, the 3-chamber type electrolyzer can overcome the foregoing drawback, i.e. a part of the useful oxidizing substances or a part of the reducing substances can be prevented from migrating into the adjacent chamber because of the presence of the intermediate chamber to which the influent water is supplied. However, this apparatus also has difficulty in selectively determining characteristics of EIW such as a wide range of oxidation-reduction potentials, pH and so on. For instance, when deionized water is electrolyzed, the resultant anode chamber water and cathode chamber water have oxidation-reduction potentials and pH's in very limited ranges. Further, even if deionized water added with an electrolyte is used, it is very difficult to selectively and arbitrarily determine the oxidation-reduction potentials and pH's of the anode chamber EIW and the cathode chamber water as desired.

This problem is serious when EIW is used for cleaning purposes.

In order to enhance cleaning effects on an industrial scale, it is necessary adequately, to examine materials treatment of the surfaces of the objects to be cleaned, and the nature and condition of contaminants adhering to the objects, and to select those characteristics of cleaning solutions such as oxidation-reduction potential, pH and so on which are best suited for objects to be cleaned. Further, contaminants of solid objects are usually a mixture of metals, particulate substances, oil and the like. In such a case, a plurality of cleaning solutions should be sequentially used in combination so as to accomplish cleaning results as desired. For this purpose, it is preferable that the characteristics, i.e. the oxidation-reduction potential, pH and the like, of the anode chamber and the cathode chamber EIW can be independently and selectively determined in desired ranges. However, the foregoing 3-chamber type electrolyzer apparatus cannot meet this requirement, i.e. it is not possible independently to determine the characteristics of the water emerging from each chamber. When operating conditions such as the amount of electrolytes to be supplied, and the composition, concentration or pH of EIW after the addition of electrolytes to the the influent water to be subjected to the electrolysis are determined on the basis of the desired characteristics of the anode chamber EIW to be used for the cleaning, the characteristics of the cathode chamber EIW, which is simultaneously produced with the anode chamber EIW, inevitably depend upon those operating conditions for producing the anode EIW desired. Thus, it is very difficult to independently and selectively determine the characteristics of the cathode chamber EIW useful for the cleaning. The same is true of a case in which the characteristics of the cathode chamber water are used as criteria. Therefore, it is substantially impossible to effectively produce the anode chamber EIW and the cathode chamber water both having desired characteristics by use of either of the apparatus shown in FIGS. 2 and 3. This is because the operating conditions for producing the desired anode chamber EIW are different form those for producing the desired cathode chamber water. The foregoing problem is an obstacle to the application of the electrolyzed water producing apparatus on an industrial scale.

There are additional problems in the EIW producing apparatuses shown in FIGS. 2 and 3. Specifically, one is that electrolytes for the cleaning solution have to be wasted, and the other is that cleaning solutions suitable for assuring highly clean objects is difficult to obtain, as described below.

In order to simultaneously produce both the acidic and oxidizing anode chamber EIW and the alkaline and reducing cathode chamber EIW in one apparatus, it is necessary to use aqueous solutions of salt, as the influent water, which consists of cations other than hydrogen ions and anions other than hydroxide ions, to make the anode chamber water and the cathode chamber EIW acidic and alkaline, by migrating the electrolyte ions in electrolytic chambers. However, when such influent water is used, a relatively large amount of cations other than the hydrogen ions which are contained in the influent water would inevitably remain in the anode chamber EIW produced. Similarly, a relatively large amount of anions other than the hydroxide ions would inevitably remain in the cathode chamber water. Therefore, in order to set the pH of the anode chamber water at a target value, anions other than the hydroxide ions are required so as to neutralize the remaining cations and to attain the target pH. As for the cathode chamber water, additional cations other than the hydrogen ions are necessary so as to neutralize the remaining anions and to attain the target pH. This means that a considerable amount of chemicals are necessary to neutralize the ions. Such chemicals are not indispensable to the original functions of the EIW producing apparatuses.

In the case of electronic devices which should be extremely clean, the presence of impurities in cleaning solutions seriously affects the characteristics and yield of the electronic devices. Thus, the cleaning solutions should be substantially free from any impurities. However, if the anode chamber EIW contains residual cations original with the influent water other than the hydrogen ions, or if the cathode chamber EIW contains the residual anions original with the influent other than the hydroxide ions, such residual ions become impurities, and tend to be deposited on the surfaces of the electronic devices as solid salts or ionic crystals, when the electronic devices are dried. Deposition of such solid salts would adversely affect the characteristics and yield of the electronic devices.

At present, the deposition of the above-mentioned ionic crystals on the electronic devices is evaded by using cleaning solutions in which alkali such as ammonia or acid such as hydrochloric acid or sulfuric acid, and hydroperoxide are mixed at certain ratios. In this case, the cleaning solutions are diluted with high-purity water.

When EIW (i.e. anode chamber EIW water and cathode chamber EIW) produced by the apparatus shown in FIGS. 2 or 3 for which electrolyte influent water is fed, are used to clean the electronic devices in place of the above-mentioned cleaning solutions, it is still impossible to overcome the problem that the deposition of the ionic crystals on the dried electronic devices adversely and seriously affects the characteristics and yield of the electronic devices.

Granted that all of the foregoing problems are overcome, it is very difficult to produce, on a commercial scale, the electrolyzed water without impurities as long as electrolyte influent water is used for the apparatus of FIGS. 2 or 3. This is because impurities tend to be mixed during the production of electrolytic solution from the influent.

When an electrolyte water solution is used as the influent water for the electrolyzed water producing apparatus, the influent is required to be substantially free from impurities. In order to prepared such influent water the influent, it is conceivable to add highly pure electrolyte to deionized water or high-purity water. Chemicals (electrolytes) which are pure enough to be used for cleaning the electronic devices and are available on an industrial scale are mainly aqueous solutions of acids and bases. However, to simultaneously produce acidic and oxidizing anode chamber EIW and alkaline reducing cathode chamber water using the apparatus of FIGS. 2 or 3, it is required that cations other than the hydrogen ions and anions other than the hydroxide ions should coexist in the influent water. Thus, an aqueous acid solution and an aqueous basic solution have to be mixed at a predetermined ratio. For this purpose, a facility for mixing such solutions is necessary. This not only complicates the EIW producing process but also causes problem that the electrolyte water solution may be contaminated during the mixing process.

SUMMARY OF THE INVENTION

The present invention is intended to overcome the foregoing problems which are inherent in the two- or three-chamber type electrolyze of the prior art.

A first object of the invention is to provide a novel EIW producing apparatus which can prevent disappearance of useful oxidizing or reducing substances produced through the electrolysis because of the oxidation or reduction reactions in electrolytic chambers, and which is structured such that the oxidation-reduction potential, pH and other characteristics of at least anode or cathode chamber EIW can be independently and selectively controlled.

The present invention has a second object to provide an electrolyzed EIW producing apparatus which can produce acidic and oxidizing anode chamber EIW and/or alkaline and reducing cathode chamber EIW without wasting chemicals.

It is a third object of the invention to provide an EIW producing apparatus for producing cleaning solutions which are applicable to devices requiring very clean surfaces, are free from unnecessary ions, and do not give rise to crystals which might remain on the surface of cleaned and dried devices.

It is a fourth object of the invention to provide an electrolyzed water producing apparatus which can overcome the problems encountered when an aqueous solution containing a mixture of high purity acid and base is supplied as the influent water, and which can produce EIW without a process of mixing high purity acid and base to prepare aqueous solution so as to produce EIW which can be ideally used for sterilization, anti-oxidation treatment, removal of contaminants sticking to the surfaces of solid objects.

One of the features of the present invention is a novel electrolyzer, which comprises an anode chamber housing an anode, a cathode chamber housing a cathode, and an intermediate chamber sandwiched between the anode and cathode chambers via a pair of diaphragms, a plurality of inlet lines for supplying the influent water to each of the foregoing three chambers, outlet lines for discharging three kinds of water treated in the anode, intermediate and cathode chambers, and electrolyte supplying unit(s) connected to the outlet line(s) from the anode and 1 or cathode chambers. The electrolyte supplying unit(s) can control at least the amount of electrolytes to be supplied, and the composition, concentration or pH of EIW after the addition of electrolytes.

Specifically, the EIW producing apparatus of the present invention comprises: an anode and a cathode; an electrolyze including an anode chamber housing the anode, a cathode chamber housing the cathode, and an intermediate chamber disposed between the anode chamber and the cathode chamber, the intermediate chamber being partitioned via a pair of diaphragms from the anode chamber and the cathode chamber; a plurality of inlet lines for respectively providing an influent water to the anode chamber, the cathode chamber and the intermediate chamber in the electrolyze; a plurality of outlet lines for respectively discharging treated water from the respective chambers in the electrolyze; and electrolyte supplying unit(s) disposed in the outlet line(s) connected to the anode chamber and/or the cathode chamber.

The electrolyte supplying unit(s) controls at least the amount of electrolytes to be supplied and the composition, concentration or pH of EIW after the addition of electrolyter. The electrolyte supplying unit can control the foregoing items but also other factors independently or collectively.

In the foregoing apparatus configuration, the outlet lines from the anode chamber and/or the cathode chamber can be divided into a plurality of branches, to which electrolyte supplying units may be partially or wholly connected. This enables production of EIW having different characteristics.

In the EIW producing apparatus, a part of substances oxidized on the surface of the anode and a part of substances reduced on the surface of the cathode may migrate into the intermediate chamber via s pair of the diaphragms, but are discharged via its outlet line along with water introduced into the intermediate chamber via its inlet line. Thus, both the oxidized substances and the reduced substances can be prevented from migrating into the opposite chambers and from being neutralized due to the mutual oxidation-reduction reaction.

The electrolyte supplying units can independently and selectively control at least the amount of electrolytes to be supplied, the composition, concentration or pH of EIW after the addition of electrolytes. Thus, characteristics such as the oxidation-reduction potentials and pH of the anode chamber effluent and the cathode chamber effluent can be independently and selectively determined with ease.

The electrolytic chambers may be made of any materials which are resistant to the influent water to be supplied thereto, and EIW produced by the EIW producing apparatus. For instance, the electrolytic chambers may be made of organic materials such as polyvinyl chloride (PVC), polypropylene (PP) and acrylic resin, inorganic materials such as ceramics and glass, or metals whose surface is lined with rubber or is coated with a coating material.

The diaphragms may be made of polymers such as cellulose, polyethylene, polypropylene, polyester, polystyrene and fluoro-resin, filters or porous films made of inorganic materials such as ceramics, or ion-exchange membranes. When the ion-exchange membranes are used as the diaphragms, they can lower the electrolytic voltage because of their electric conductivity, which can reduce power consumption when a constant electrolytic current is maintained during the electrolysis. Therefore, ion exchange membranes are especially preferable if the electrolyte concentration of the water is low. Further, when either the anode or cathode is arranged in close contact with the ion-exchange membrane, the electrolytic voltage can be further reduced, and power consumption can be reduced. When a cation-exchange membrane is used as the diaphragm between the anode chamber and the intermediate chamber, and when an anion-exchange membrane is used as the diaphragm between the cathode chamber and the intermediate chamber, these membranes can reduce, due to ion exclusion thereof, amounts of oxidized substances and substances matters migrating into the intermediate chamber from the anode and cathode chambers. The cation-exchange membranes may be a strong acid cation-exchange membrane made of fluororesin having $—SO_3^-$, functional groups such as the strong acid cation-exchange membrane NAFION 117 (tradename: produced by Du Pont de Nemours & Co.), and NAFION 350, or styrene-divinyl benzene copolymers having $—SO_3^-$ functional groups, e.g. NEOSEPTA CMX AMH (produced by Tokuyama Soda, Co., Ltd.)

The anion-exchange membranes may be a strong base anion-exchange membrane mode of flupro-resin having anion exchange functional groups such as TOSFLEX IE-SA, TOSFLEX IE-DF, TOSFLEX IE-SF (produced by Tosoh Corporation) or styrenedivingl benzene copolymers having anion exchange functional groups such as NEOSEPTA AMH (produced by Tokuyama Soda, Co., Ltd.)

The diaphragms may be made of any materials so long as they can transfer ions between the chambers on both sides thereof. Further, the diaphragms themselves are always not required to be in the shape of a membrane, but may be in any shape so long as they can prevent direct mixture of water in the cathode and anode chambers.

The anode and cathode may be made of metal, alloy, metal oxide, metal substrates plated or coated with metal, alloy or metal oxide, or conductive materials such as sintered carbon. These electrodes may be in the shape of a plate, a perforated plate, a mesh and so on. Especially, the anode should preferable be made of materials which are resistant to acid, and are not easily oxidized. For instance, , i.e. Pt, Pd, Ir, $\beta\text{-}PbO_2$, and $NiFe_2O_4$ are preferable. The cathode should be made of materials which are resistant to alkali. For instance, Pt, Pd, Au, steel, carbon steel, Ag, Cu, graphite, and along carbon are preferable.

Various acids, bases, salts or mixtures of these materials at an appropriate ratio can be selected as an electrolytes to be added to the outlet line(s) connected to the anode chamber and/or the cathode chamber. Generally, the electrolyte has the concentration of 0.001 mg/l to 100 g/l, preferably 0.01 mg/l to 10 g/l. The acids may be inorganic acids such as hydrochloric acid, sulfuric acid, carbonic acid and nitric acid, or organic acids such as acetic acid, citric acid and oxalic acid. The bases may be ammonia and amine bases. Further, a part of the electrolyte can be changed to a more useful material by the electrolysis reaction. For instance, when an electrolyte containing a halogenide is supplied to the outlet line from the anode chamber, and a halogen acid is generated in the anode chamber.

Further, the electrolyte may be salts having a pH buffer function such as ammonium salt, carbonate and oxalate mixtures of these salts and acid or base. In such a case, electrolyzing conditions such as the electrolytic current do not adversely affect the pH of the electrolyzed solution. Therefore, the characteristics of the anode chamber EIW and the cathode chamber EIW can be independently determined with ease.

As described above, the electrolytes are added to either or both of the outlet lines from the anode chamber and the cathode chamber. For instance, when EIW is to be used for sterilization, acidic and oxidizing anode EIW is generally required. Thus, the electrolyte supplying unit is connected only to the outlet line from the anode chamber while no electrolyte supplying unit is connected to the outlet line from the cathode chamber. On the other hand, when EIW is to be used to prevent oxidation of metal surfaces, the electrolyte supplying unit is connected only to the outlet line from the cathode chamber so as to produce alkaline and reducing cathode chamber EIW, and no such unit is connected to the outlet line of the anode chamber. In these cases, it is possible to reduce the number of the electrolyte supplying units, which simplifies the configuration of the EIW producing apparatus.

The electrolyte supplying units may be connected to the outlet lines of the anode and cathode chambers, or one electrolyte applying unit may be connected to the outlet line of either the anode chamber or the cathode chamber, as described above. In either of these cases, electrolyte supplying units may be also connected to the inlet lines of both the anode and cathode chambers, or one electrolyte supplying unit may be connected to the inlet line of either the anode or cathode chamber.

The present invention is effective even when electrolytes are supplied both to the outlet lines of the anode and cathode chambers, and to the inlet lines of the anode and cathode chambers.

When an electrolyte is supplied as an electrolyte aqueous solution, the electrolyte applying unit include an electrolyte aqueous solution reservoir and a pump for supplying this solution to the outlet line of either the anode chamber or the cathode chamber.

The electrolyte aqueous solution reservoir may be made of any material unless it is subject to degradation or dissolution due to the electrolyte to be stored. For instance, a high-density polyethylene reservoir is preferable. The pump for supplying the electrolyte aqueous solution may be of any type and made of any material so long as it is resistant to the electrolyte solution to be pumped and can feed a necessary amount of the electrolyte solution. For instance, a reciprocative type constant volume pump is preferable.

If the surface of the electrolyte is ammonia gas, carbon-dioxide gas or the like, the electrolyte supplying unit includes a gas cylinder, a pipe for connecting the cylinder to the outlet line of the anode or cathode chamber, wherein a gas pressure regulator and a gas flow controller are mounted to the pipe to control the pressure and flow rate of the gas to be introduced to the outlet line.

The amount of electrolyte to be supplied, the composition, concentration and pH of EIW after the addition of the electrolyte are controlled so as to determine the characteristics, e.g. the oxidation-reduction potential and pH, of EIW which are effective for a particular purpose. For instance, assuming that a plurality of ions are supplied to the electrolyzer, the concentration and dosage level of each thereby producing EIW best suited for a particular application. The pH of EIW is controlled so as to keep oxidizing and reducing substances produced by the electrolysis in a stable state until the EIW is put to use. One or a plurality of the foregoing factors may be controlled for the desired purpose.

In order to control the foregoing factors, a predetermined amount of the electrolyte having a predetermined concentration may be added to the influent water using the constant volume pump. When it is preferable to vary the great values as desired, an automatic densitometer, a pH meter an oxidation-reduction potential meter the like may be disposed on the electrolyte supplying piping downstream of the electrolyte supplying point. Then, a device for varying an amount of the electrolyte supplied may be provided in the electrolyte supplying unit, thereby controlling the dosage level of the electrolyte in accordance with the reading of the densitometer, the pH meter, the ORP meter or the like. Further, since qualities of the EIW vary with the electrolytic current, the foregoing factors may be controlled by changing the electrolytic current in addition to controlling dosage level of the electrolyte.

The influent water such as tap water, industrial water, underground water, deionized water or high-purity water may be supplied to the EIW producing apparatus in accordance with the particular application of EIW. For instance, when EIW is applied to sterilization to be performed in hospitals, dental clinics, restaurants, and food processing industries or anti-oxidation treatment for metal surfaces performed in metal parts producing steps, tap water, industrial water and underground water may be reliably used as the influent water. Such an influent can meet requirements for the concentration of impurities of the EIW water for the above-mentioned applications. Furthermore, a variety of ions contained in the influent water are used for pH adjustment or may be used as original materials for oxidizing or reducing substances which are generated by the electrolysis.

When used to clean electronic devices which should have very clean surfaces, a cleaning solution should have a low impurity concentration. In such a case, use of deionized water or high-purity water as the influent water of the EIW producing apparatus is preferable.

The deionized water is obtained by treating the tap water, industrial water, underground water and so on by ion-exchange resins, or by reverse osmosis. Such deionized water should preferably have an electrical conductivity of 10 µS/cm or less. Further, when EIW should have a very low impurity concentration, a high-purity water producing system, which comprises ion exchanger, membrane separation, ultraviolet irradiation degasification and so on may be used further to purify foregoing deionized water, thereby producing high-purity water which is free from trace ions, bacteria, organic matter, fine particles, and dissolved gasses. In this case, since only the electrolytes are added from the electrolyte supplying unit(s) are present in the water in the outlet lines downstream of the electrolyte supplying unit(s), it is possible to precisely characterize EIW. Further, when EIW thus obtained is filtrated by a microfiltration membrane, ultrafiltration membrane or the like, it is substantially free from impurities such as particles and have a high purity.

The high-purity water as the influent water requires a correspondingly higher electrolytic voltage. In such a case, it is preferable that solid electrolyte fill the intermediate chamber so as to lower the electrolytic voltage by virtue of the higher conductivity of the solid electrolyte. Use of the solid electrolyte is not limited to the foregoing case.

The solid electrolyte may be ion-exchange resin, ion-exchange fiber, or the like. The ion-exchange resin is preferably made of fluororesin, particularly, strong acidic cation exchange resin having $-SO_3^-$ functional groups, e.g. NAFION NR50 produced by Du Pont de Nemours & Co. However, the ion-exchange resin may be made of other material than NAFION NR50. Further, the ion-exchange resin may be of strong acidic cation exchange resin made of styrene-divinyl benzene copolymer having $-SO_3^-$ functional groups, e.g. AMBERLITE (trade name) IR-120B, IR-124, 200, strong basic anion exchange resin made of styrene-divinyl benzene copolymer having quaternary ammonium functional groups, e.g. AMBERLITE IRA-400, IRA-402BL, IRA-900 and so on.

The EIW producing apparatus of the present invention is very suitable for producing water applied to cleaning electronic devices which should have extremely clean surfaces. In such an application, both acidic oxidizing anode chamber EIW and alkaline reducing cathode chamber EIW are required to be simultaneously produced. The apparatus of the present invention can satisfy this requirement by adding aqueous solutions of high purity acid or base to the electrolyzed anode and cathode chamber EIW with dilution to a given concentration or without any dilution. To prevent the deposition of any crystals on dried surfaces of electronic devices, bases such as ammonia, amines or the like is added to the cathode chamber effluent, and acid such as hydrochloric acid, sulfuric acid, nitric acid, carbonic acid or the like is added to the anode chamber EIW.

In accordance with the present invention, the characteristics of the anode and cathode chamber EIW such as the oxidation-reduction potential and pH can be independently controlled by the electrolyte supplying units disposed downstream of the electrolyzer. Therefore, the characteristics of the anode and cathode chamber EIW can be independently controlled such that they are suitable for intended applications. Further, EIW can be produced on a large industrial scale.

The EIW producing apparatus of the present invention overcomes the problem that the oxidizing products and reducing products are not caused to disappear due to the mutual oxidation-reduction reactions in the chambers of the electrolyzer. Further, the anode chamber EIW and the cathode chamber EIW are free from unnecessary residual ions, so the EIW can be produced as desired without wasting electrolytes to be added.

According to the present invention, the EIW producing apparatus is advantageous in the following respects.

The apparatus can produce easily electrolyzed EIW which is suitable for cleaning objects whose surfaces should be kept very clean, and do not give rise to any crystals on cleaned objects because of the absence of unnecessary ions.

The electrolyte applying unit(s) can be connected to the outlet line of either the anode or cathode chamber depending upon the intended use of EIW. This simplifies the EIW producing apparatus.

When deionized water or high-purity water as an influent is supplied to the anode, intermediate and cathode chambers, the apparatus can produce EIW substantially free from any impurities, and control characteristics of EIW more strictly.

When the diaphragms between the three chambers are ion-exchange membranes, it is possible to reduce the electrolytic voltage and power consumption because of the electrical conductivity of the ion-exchange membranes.

The electrolysis can be performed without using a high voltage when the intermediate chamber is filled with a solid electrolyte and deionized water or high-purity water is used as an influent water.

DETAILED DESCRIPTION OF THE PREFERRED EMBODIMENT

The present invention will be described with reference to a preferred embodiment in which electrolytes are added to the anode chamber EIW and the cathode chamber EIW.

Figure 1:
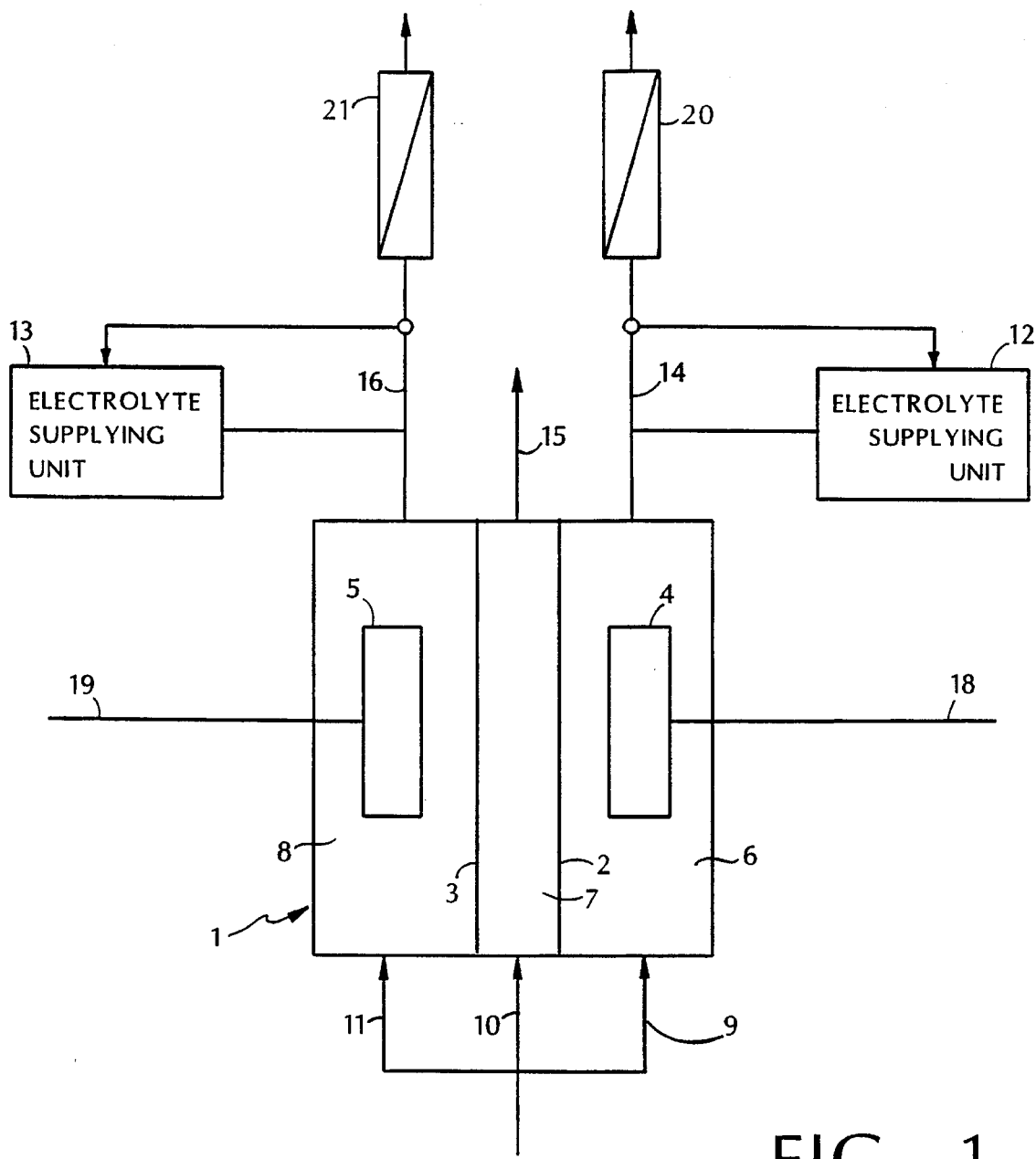
FIG. 1 is a schematic diagram showing the configuration of an EIW producing apparatus according to an embodiment of the present invention.
Figure 2:
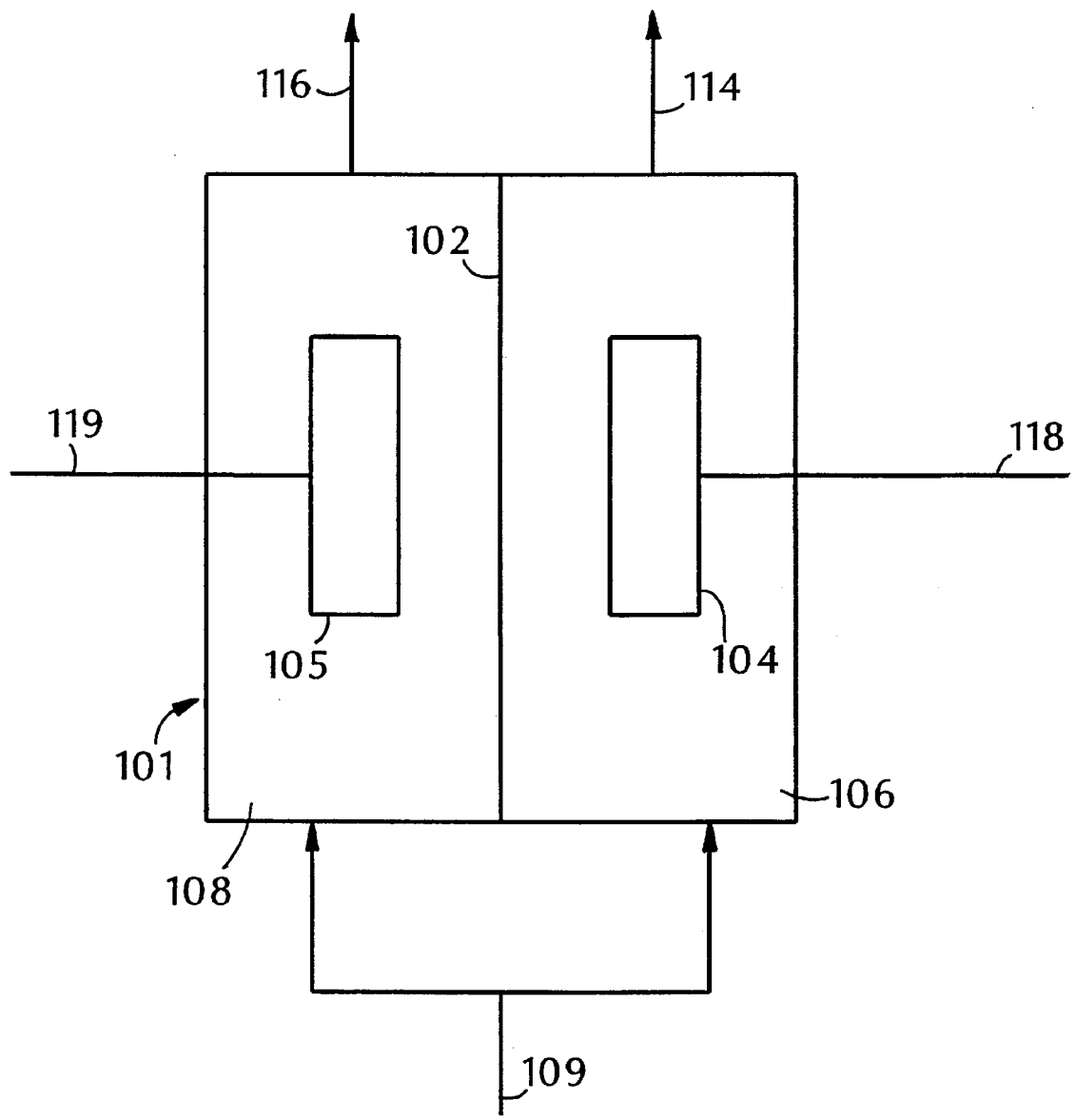
FIG. 2 is a schematic diagram showing the configuration of an example of a two-chamber type EIW producing apparatus of the prior art.
Figure 3:
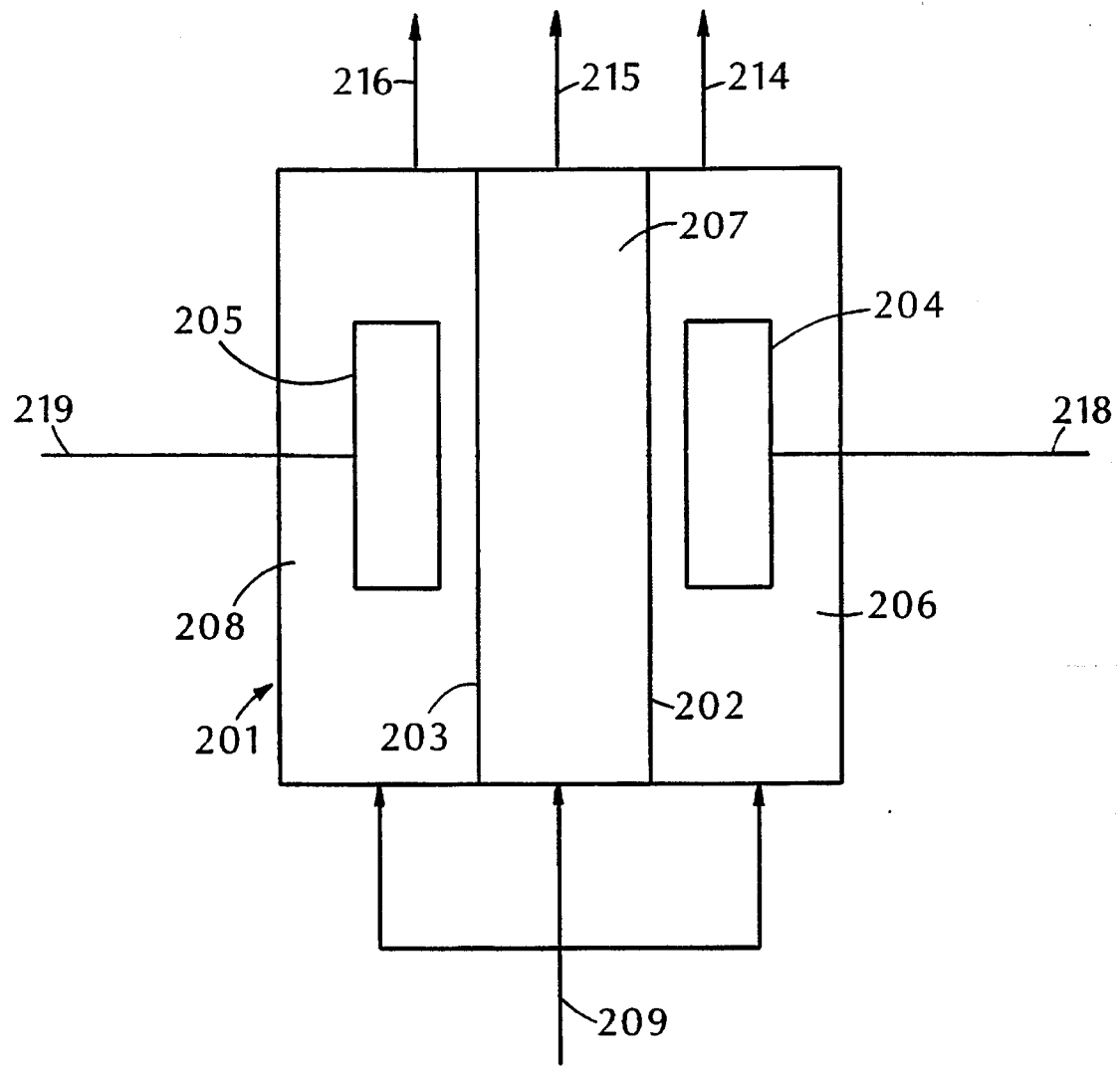
FIG. 3 is a schematic diagram showing the configuration of an example of a three-chamber type EIW producing apparatus of the prior art.

Referring to FIG. 1, the EIW producing apparatus comprises a three-chamber electrolyzer 1, which includes an anode chamber 6 housing an anode 4, an intermediate chamber 7, a cathode chamber 8 housing a cathode 5, and diaphragms 2 and 3 separating the foregoing three chambers. A DC voltage is applied between the anode 4 and the cathode 5 via power lines 18 and 19.

An influent water is supplied to the three chambers via inlet lines 9, 10 and 11 which are branched from a common feed pipe.

The effluent(EIW) from the anode chamber 6 flows out via an outlet line 14, an effluent(EIW) from the intermediate chamber 7 is discharged via an outlet line 15, and the effluent from the cathode chamber 8 flows out via an outlet line 16.

Filters 20 and 21 are respectively disposed in the outlet lines 14 and 16, and are microfiltration membranes for removing fine particles and so on contained in the EIW from the anode and cathode chambers 6 and 8. The use of these membranes are preferable when producing cleaning solutions for electronic devices which should have very clean surfaces.

The invention is characterized in that an electrolyte supplying unit 12 is connected to the outlet line 14 upstream of the filter 20, i.e. between the anode chamber 6 and the filter 20, thereby adding the electrolyte(s) to the EIW from the anode chamber 6. Similarly, an electrolyte supplying unit 13 is connected to the outlet line 16 upstream of the filter 21 so as to add the electrolyte(s) to the EIW from the cathode chamber 8.

According to the invention, some of the oxidizing substances produced on the surface of the anode 4 and some of the reducing substances produced on the surface of the cathode 5 may migrate into the intermediate chamber 7 via the diaphragms 2 and 3. However, the migrating oxidizing or reducing substances are discharged out of the electrolyzer 1 entrained by the influent water supplied to intermediate chamber 7 via the inlet line 10 and charged from the inlet line 15. Thus, it is possible to prevent the problem that the oxidizing substances and the reducing substances may migrate into the chambers having opposite polarities and are caused to disappear due to the mutual oxidizing and reducing reactions.

The electrolyte supplying units 12 and 13, which are connected to the outlet lines 14, 16 of the anode and cathode chambers 6, 8, can independently and selectively control at least one of the amount of electrolyte(s) to be supplied, the composition, concentration and pH of EIW after the addition of the electrolyte(s) to the anode and cathode chambers 6, 8. Thus, the electrolyte(s) in the anode and cathode chamber EID can be independently controlled with respect to their compositions, concentrations, pH and so forth. Therefore, characteristics of the anode chamber EIW and the cathode chamber EIW such as the oxidation-reduction potential and pH can be controlled as desired, easily, independently, simultaneously and selectively.

EXAMPLE 1

EIW was produced using the apparatus of FIG. 1 under the following conditions. The electrolyzer 1 was made of polypropylene material, and the diaphragms 2 and 3 were cation exchange membranes (NAFION 350 manufactured by Du Pont de Nemours & Co.). The anode 4 and the cathode 5 were platinum mesh electrodes of 180×240 mm. Cation exchange resin (NAFION NR 50) was charged to the intermediate chamber 7.

The electrolyte supplying unit 12 supplied hydrochloric acid to the outlet line 14 from the anode chamber 6. Similarly, the electrolyte supplying unit 13 applied ammonia water to the outlet line 16 from the cathode chamber 8. Hydrochloric acid and ammonia water were diluted to desired concentrations and stored in polyethylene reservoirs. The electrolyte supplying units 12 and 13 supplied these electrolytes to the outlet lines 14 and 16 using reciprocative type constant volume pumps (not shown). High-purity water was used as an influent (specific resistance: 18MΩ.cm).

Electrolyzing Conditions:
Electrolytic current: 10 A (current density: 2.3 A/dm$^2$)
Flow rate: 50 liters/hr. in each chamber
Working temperature: Room temperature Concentrations of the electrolytes (hydrochloric acid and ammonia) in the EIW were changed by adjusting the flow rate of the pumps of the electrolyte supplying units 12 and 13 as shown in Table 1, which shows characteristics of the produced anode and cathode chamber EIW.

TABLE 1

| | Anode chamber EIW | | | Cathode chamber EIW | | |
|---|---|---|---|---|---|---|
| Hydrochloric acid concentration (mg · HCl/l) | pH | Oxidation-reduction potential (mV) | Ammonia concentration (mg · NH$_3$/l) | pH | Oxidation-reduction potential (mV) | |
| 0 | (7) | 1,050 | 0 | (7) | −500 | |
| 0.73 | 4.7 | 1,200 | 0.34 | 9.1 | −590 | |
| 73 | 2.7 | 1,270 | 34 | 10.3 | −600 | |
| 1460 | 1.4 | 1,330 | 680 | 10.7 | −630 | |

In Table 1, the oxidation-reduction potentials are expressed in terms of potentials with respect to a normal hydrogen electrode (NHE). When the electrolyte concentration was 0 mg/l (without any electrolyte), the pH of the high-purity water of 18MΩ.cm cannot be measured. Therefore, (pH 7) is listed only as a reference value.

As can be seen from Table 1, the pH of the anode chamber EIW varied from 1.4 to 7 when the dosage level of hydrochloric acid added to the outlet line 14 of the anode chamber 6 was changed from 0 to 1,460 mg HCl/l. In other words, the pH of the anode chamber EIW could be adjusted by regulating the dosage level of hydrochloric acid to be added. The oxidation-reduction potential was adjustable between 1050 mV and 1330 mV (vs. NHE). Characteristics of the cathode chamber EIW were adjustable as follows: pH was adjustable between 7 and 10.7 and the oxidation-reduction potential was adjustable between −630 mV and −500 mV (vs. NHE) by controlling the dosage level of ammonia to be added to the outlet line 16 of the cathode chamber 8 (i.e. changing the concentration of ammonia to 0–680 mgNH$_3$/l in the cathode chamber EIW). In this Examples, hydrochloric acid was supplied to the outlet line 14 while ammonia is supplied to the outlet line 16. Therefore, the characteristics of the anode chamber effluent and the cathode chamber EIW can be independently controlled, so no ammonium ions were mixed into the anode chamber EIW, and no chloride ions were mixed into the cathode chamber EIW.

COMPARATIVE EXAMPLE 1

EIW was produced in a differenct, conventional method as a comparative example. In this example, the electrolytes used in the Example 1 were not added. Aqueous ammonium chloride solution was added to the high-purity water of the Example 1 so as to obtain an influent water, which was supplied to the three chambers of the electrolyzer 1 at a flow rate of 100 liters/hour. Concentrations of the aqueous ammonium chloride solution (influent water) were changed as shown in Table 2. The other conditions were the same as those in Example 1.

TABLE 2

| Ammonium chloride concentration (mg · $NH_4Cl/l$) | Anode chamber EIW | | | Cathode chamber EIW | | |
|---|---|---|---|---|---|---|
| | pH | Oxidation-reduction potential (mV) | $NH_4^+$ (mg · $NH_4^+/l$) | pH | Oxidation-reduction potential (mV) | $Cl^-$ (mg $Cl^-/l$) |
| 0 | (7) | 550 | <0.001 | (7) | −400 | <0.001 |
| 1.07 | 5.3 | 690 | 0.30 | 9.0 | −490 | 0.67 |
| 107 | 3.4 | 800 | 34 | 9.9 | −580 | 64 |
| 2,140 | 2.3 | 1,200 | 640 | 10.7 | −600 | 1,390 |

As shown in Table 2, it was possible to change the pH and the oxidation-reduction potential of the EIW by changing the concentration of the ammonium chloride in the influent water. However, it was impossible to independently control the characteristics of the anode chamber EIW and the cathode EIW.

A considerable amount of ammonium was present in the anode chamber EIW, and similarly, chloride ions were present in the cathode chamber effluent.

What is claimed is:

1. Electrolytic ionized water producing apparatus comprising:
   (a) at least one anode and at least one cathode;
   (b) an electrolyzer including an anode chamber housing the anode, a cathode chamber housing the cathode, and an intermediate chamber disposed between the anode chamber and the cathode chamber, the intermediate chamber being partitioned via diaphragms from the anode chamber and the cathode chamber;
   (c) a plurality of inlet lines for supplying influent water to the anode chamber, the cathode chamber and the intermediate chamber in the electrolyzer;
   (d) a plurality of outlet lines for discharging electrolytic ionized water from the respective chambers in the electrolyzer; and
   (e) at least one electrolyte supplying unit disposed on the outlet line connected to the anode chamber or the cathode chamber, the electrolyte supplying unit supplying electrolyte to the electrolytic ionized water.

2. The electrolytic ionized water producing apparatus as in claim 1, wherein the electrolyte supplying unit controls at least one of the dosage level to be supplied, the composition and concentration of the electrolyte.

3. The electrolytic ionized water producing apparatus as in claim 1, wherein the electrolyte supplying unit controls any of the dosage level of electrolyte to be supplied, the composition and concentration of the electrolyte in order to control at least one of composition, concentration and pH of the electrolytic ionized water after the addition of the electrolyte.

4. The electrolytic ionized water producing apparatus as in claim 1, wherein it is the pH of the electrolytic ionized water that the electrolyte supplying unit can control after the addition of the electrolyte to the electrolytic ionized water.

5. The electrolytic ionized water producing apparatus as in claim 4, wherein the electrolytic ionized water comprises an acidic electrolyte.

6. The electrolytic ionized water producing apparatus as in claim 4, wherein the electrolytic ionized water comprises an alkaline electrolyte.

7. The electrolytic ionized water producing apparatus as in claim 1, wherein the anode and the cathode chambers include influent water consisting of tap water, deionized water or high-purity water.

8. The electrolytic ionized water producing apparatus as in claim 1, wherein the diaphragms are ion exchange membranes.

9. The electrolytic ionized water producing apparatus as in claim 1, wherein the intermediate chamber is filled with a solid electrolyte.

10. An apparatus for producing an electrolytic ionized water by applying DC voltage between an anode and a cathode, said apparatus comprising:
    (a) an anode chamber housing an anode and having an inlet line and an outlet line in fluid communication therewith;
    (b) the cathode chamber housing a cathode and having an inlet line and an outlet line in fluid communication therewith;
    (c) an intermediate chamber disposed between the anode chamber and the cathode chamber, the intermediate chamber being partitioned from the anode chamber and the cathode chamber via a pair of diaphragms and having an inlet line and an outlet line in fluid communication therewith;
    (d) a source of influent water in fluid communication with said inlet lines so as to supply water to the anode chamber, the cathode chamber and intermediate chamber; and
    (e) at least one electrolyte supplying unit for providing a controlled introduction of electrolyte into at least one of the anode chamber outlet line and the cathode chamber outlet line.

11. The apparatus as in claim 10 wherein at least one of the anode chamber outlet line and the cathode chamber outlet line contain a filter element.

12. A method for producing an electrolytically ionized water by applying a DC voltage between an anode and an cathode comprises:
    (a) introducing influent water streams into each of an anode chamber, a cathode chamber and an intermediate chamber disposed between the anode chamber and the cathode chamber, wherein the intermediate chamber is separated from the anode chamber and the cathode chamber in a manner that allows ions to flow between the chambers;
    (b) subjecting water in the chambers to a DC voltage to provide electrolytically ionized water in at least the anode chamber and cathode chamber; and (c) removing outlet streams from the anode chamber, cathode chamber and intermediate chamber;

wherein (c) further includes a controlled introduction of electrolyte into at least one of the anode chamber influent water stream or the cathode chamber influent water stream.

13. The method according to claim 12, wherein the amount of electrolyte introduced is controlled in accordance with a characteristic of the influent water to which the electrolyte is to be supplied.

14. The method according to claim 12 wherein the intermediate chamber is separated from the anode chamber and cathode chamber via a pair of diaphragms wherein at least one of the diaphragms is an ion-exchange membrane.

* * * * *